United States Patent
Kwon et al.

(10) Patent No.: US 9,559,548 B2
(45) Date of Patent: Jan. 31, 2017

(54) COVER MEMBER, ELECTRONIC DEVICE, AND METHOD FOR WIRELESS CHARGING

(71) Applicant: Samsung Electronics Co., Ltd., Suwon-si, Gyeonggi-do (KR)

(72) Inventors: Hyung-Jin Kwon, Namyangju-si (KR); Jang-Rak Kim, Seongnam-si (KR); Sung-Sik Jung, Suwon-si (KR); Ji-Sang Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 203 days.

(21) Appl. No.: 14/466,252

(22) Filed: Aug. 22, 2014

(65) Prior Publication Data

US 2015/0256021 A1    Sep. 10, 2015

(30) Foreign Application Priority Data

Mar. 7, 2014  (KR) ........................ 10-2014-0027252

(51) Int. Cl.
| | | |
|---|---|---|
| *H02J 7/00* | (2006.01) | |
| *H02J 7/02* | (2016.01) | |
| *H02J 5/00* | (2016.01) | |
| H02J 17/00 | (2006.01) | |
| H01F 27/02 | (2006.01) | |
| H01F 38/14 | (2006.01) | |
| G06F 1/16 | (2006.01) | |

(52) U.S. Cl.
CPC ............ *H02J 7/025* (2013.01); *G06F 1/1635* (2013.01); *H02J 5/005* (2013.01); *H02J 7/0042* (2013.01); *G06F 1/1632* (2013.01); *H01F 27/02* (2013.01); *H01F 38/14* (2013.01); *H02J 17/00* (2013.01)

(58) Field of Classification Search
CPC ............ H02J 7/025; H02J 17/00; H02J 5/005; H01F 38/14; H01F 27/02
USPC .......................................... 320/107–108, 114
See application file for complete search history.

(56) References Cited

U.S. PATENT DOCUMENTS

| | | | | |
|---|---|---|---|---|
| 8,907,752 | B2 * | 12/2014 | Wodrich ............... | G06F 1/1635 335/205 |
| 9,112,363 | B2 * | 8/2015 | Partovi ................... | H02J 7/025 |
| 2009/0033564 | A1 * | 2/2009 | Cook .................... | G06F 1/1616 343/702 |
| 2009/0243397 | A1 * | 10/2009 | Cook ...................... | H02J 5/005 307/104 |
| 2013/0221913 | A1 * | 8/2013 | Kim ...................... | H02J 7/0042 320/108 |
| 2013/0241478 | A1 * | 9/2013 | Azancot ................. | H01F 38/14 320/108 |
| 2013/0342025 | A1 * | 12/2013 | Cook ...................... | H02J 5/005 307/104 |
| 2014/0184150 | A1 * | 7/2014 | Walley .................... | H02J 5/005 320/108 |

(Continued)

FOREIGN PATENT DOCUMENTS

| | | |
|---|---|---|
| KR | 10-2012-0110674 A | 10/2012 |
| KR | 10-2013-0000246 A | 1/2013 |
| KR | 10-2013-0024757 A | 3/2013 |

*Primary Examiner* — Stacy Whitmore

(74) *Attorney, Agent, or Firm* — Jefferson IP Law, LLP

(57) ABSTRACT

A cover member of an electronic device is provided. The cover member includes covers hingedly connected, wherein each cover includes a power receiving member configured to wirelessly receive power.

14 Claims, 10 Drawing Sheets

(56) References Cited

U.S. PATENT DOCUMENTS

| 2014/0253024 A1* | 9/2014 | Rautiainen | H02J 7/025 320/108 |
| 2014/0306654 A1* | 10/2014 | Partovi | H02J 7/025 320/108 |
| 2015/0149335 A1* | 5/2015 | Son | G06Q 50/06 705/34 |

* cited by examiner

COVER MEMBER, ELECTRONIC DEVICE, AND METHOD FOR WIRELESS CHARGING

CROSS-REFERENCE TO RELATED APPLICATION(S)

This application claims the benefit under 35 U.S.C. §119 (a) of a Korean patent application filed on Mar. 7, 2014 in the Korean Intellectual Property Office and assigned Ser. No. 10-2014-0027252, the entire disclosure of which is hereby incorporated by reference.

TECHNICAL FIELD

The present disclosure relates to a device and method for receiving wirelessly transmitted power and charging an electronic device.

BACKGROUND

Wireless charging (or contactless charging) technologies may be utilized for charging a battery of an electronic device that uses a rechargeable battery. The wireless charging technologies use wireless power transmission and reception. For example, without a connection of a separate charging connector between a charger and an electronic device, an electronic device may be automatically charged by just putting the electronic device on a charging pad.

For wireless charging, a wireless power transmitter and a wireless power receiver are used. The wireless power transmitter wirelessly transmits power using a power transmitting member, and the wireless power receiver wirelessly receives power transmitted from the wireless power transmitter using a power receiving member. Generally, a coil is used as the power transmitting member and the power receiving member.

The power receiving member may be included in a back side cover (or a back side case) mounted in the electronic device. When the electronic device is put on the charging pad so that the back side of the electronic device is placed on the charging pad including the wireless power transmitter, the electronic device may receive power wirelessly transmitted from the charging pad for charging.

The above information is presented as background information only to assist with an understanding of the present disclosure. No determination has been made, and no assertion is made, as to whether any of the above might be applicable as prior art with regard to the present disclosure.

SUMMARY

An electronic device including a power receiving member in only the back side of the electronic device may be wirelessly charged through only the back side of the electronic device. Also, when an electronic device lying upside down on a charging pad, since a user is inattentive or does not fully understand how to wirelessly charge the electronic device, wireless charging may not be executed.

Aspects of the present disclosure are to address at least the above-mentioned problems and/or disadvantages and to provide at least the advantages described below. Accordingly, an aspect of the present disclosure is to provide a cover member, an electronic device, and a method for executing wireless charging through an arbitrary side of the two sides of the electronic device.

Another aspect of the present disclosure is to provide a cover member, an electronic device, and a method for charging simultaneously through both sides of the electronic device.

Another aspect of the present disclosure is to provide a cover member, an electronic device, and a method for executing wireless charging irrespective of the electronic device being upside down.

Another aspect of the present disclosure is to provide a cover member, an electronic device, and a method for reducing the charging time of the electronic device.

In accordance with an aspect of the present disclosure, a cover member of an electronic device is provided. The cover member includes covers connected to be hinged, wherein each cover includes a power receiving member for wirelessly receiving power.

In accordance with another aspect of the present disclosure, an electronic device is provided. The electronic device includes a charger that charges a battery through power for charging generated by at least one of the wireless power receivers, the wireless power receivers respectively receiving power through power receiving members respectively included in covers connected to be hinged, and generating the power for charging.

In accordance with another aspect of the present disclosure, a wireless charging method of an electronic device is provided. The wireless charging method includes generating power for charging from power wirelessly received through at least one of the power receiving members respectively included in covers connected to be hinged, and charging a battery with the power for charging.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
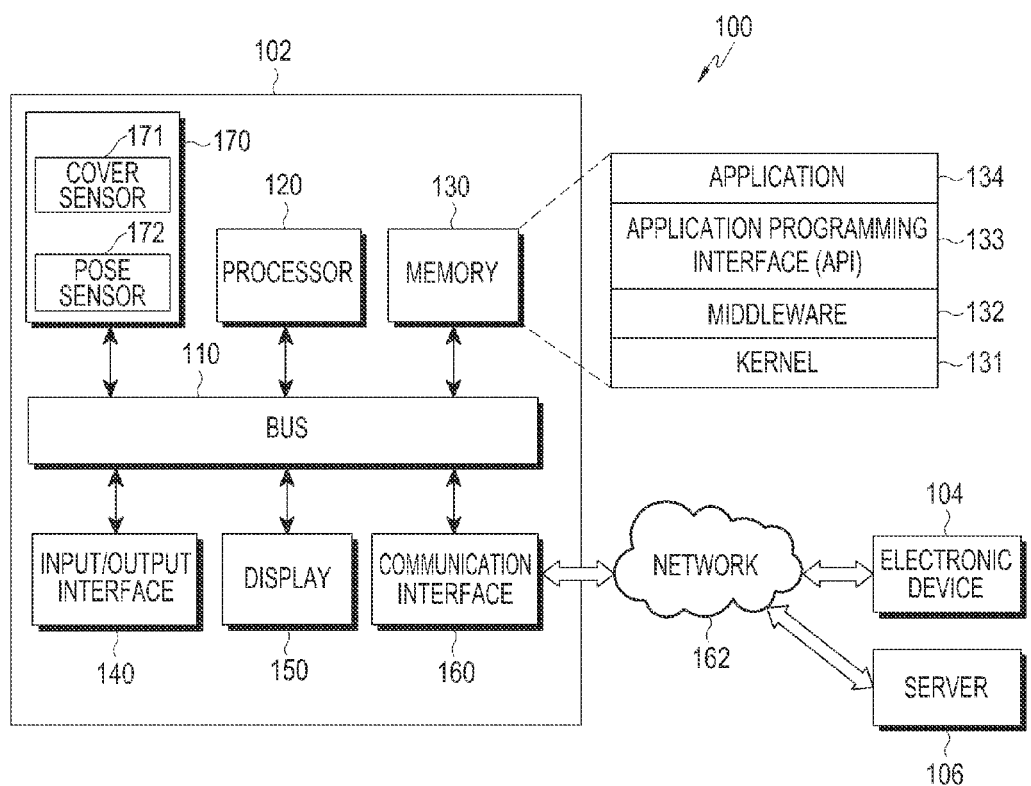
FIG. 1 is a block diagram of a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The expressions that may be used in various embodiments of the present disclosure, such as, "comprise", "may comprise" or the like indicates the existence of a disclosed corresponding function, operation, element, or the like, and may not limit additional one or more functions, operations, elements or the like. In the present disclosure, the terms such as "include" or "have" may be construed to denote a certain characteristic, number, step, operation, element, component or a combination thereof, but may not be construed to exclude the existence of or a possibility of addition of one or more other characteristics, numbers, steps, operations, elements, components or combinations thereof The expression such as "or" or the like in various embodiments of the present disclosure include any and all of the combinations of words disclosed together. For example, the expression "A or B" may include A, may include B, or may include both A and B.

The expressions such as "first", "second", or the like used in various embodiments of the present disclosure may be used to describe various elements in the various embodiments but may not limit corresponding elements. For example, the above expressions do not limit the sequence and/or importance of the elements. The expressions may be used to distinguish an element from another element. For example, a first user device and a second user device indicate different user devices although both of them are user devices. For example, without departing from the scope of the present disclosure, a first element may be named a second element. Similarly, the second element also may be named the first element.

It should be noted that if it is described that one element is "coupled" or "connected" to another element, former element may be directly coupled or connected to latter element, but they may be coupled or connected together through at least one intervening element. Conversely, when one element is "directly coupled" or "directly connected" to another element, it may be construed that they are coupled or connected together without the intervention of some other element.

The terms used in various embodiments of the present disclosure are merely used to exemplify a certain embodiment and should not limit various embodiments of the present disclosure. Singular forms are intended to include plural forms unless the context clearly indicates otherwise.

Unless defined differently, all terms used herein, which include technical terminologies or scientific terminologies, have the same meaning as a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to various embodiments of the present disclosure may include at least one of, for example, a smart phone, a tablet Personal Computer (PC), a mobile phone, a video phone, an electronic book reader (e-book reader), a laptop PC, a netbook computer, a Personal Digital Assistant (PDA), a Portable Multimedia Player (PMP), a MPEG-1 audio layer-3 (MP3) player, a mobile medical device, and a camera.

An electronic device according to various embodiments of the present disclosure may be a combination of one or more of above described various devices. Also, an electronic device according to various embodiments of the present disclosure may be a flexible device. Also, an electronic device according to various embodiments of the present disclosure is not limited to the above described devices.

FIG. 1 illustrates a network environment 100 including an electronic device 102 according to various embodiments of the present disclosure.

Referring to FIG. 1, the electronic device 102 may include a bus 110, a processor 120, a memory 130, an input/output interface 140, a display 150, a communication interface 160, and a sensor module 170. The bus 110 may be a circuit for connecting elements of the electronic device 102 and for transferring communication, for example, a control message, between the elements.

The processor 120 may, for example, receive a command from other elements, for example, the memory 130, the input/output interface 140, the display 150, the communication interface 160, the sensor module 170, and the like, through the bus 110, may interpret the received command, and may execute operation and/or data processing based on the interpreted command.

The memory 130 may store a command or data received from the processor 120 or other elements, for example, the input/output interface 140, the display 150, the communication interface 160, the sensor module 170, and the like, or may store command or data generated by the processor 120 or other elements. The memory 130 may include programming modules, for example, a kernel 131, a middleware 132, an Application Programming Interface (API) 133, an application 134, and the like. Each of the programming modules may be formed of software, firmware, or hardware, or a combination of two or more thereof.

The kernel 131 may control or manage system resources, for example, the bus 110, the processor 120, the memory 130, and the like, used for executing an operation or function implemented in other programming modules, for example, the middleware 132, the API 133, or the application 134. Also, the kernel 131 may provide an interface that allows the middleware 132, the API 133, or the application 134 to access an individual element of the electronic device 102 for control or management.

The middleware 132 may execute as a relay so that the API 133 or the application 134 executes communication with the kernel 131, and may receive and transmit data. Also, in association with work requests received from the application 134, the middleware 132 may execute a control, for example, scheduling or load balancing, for n work request, through use of, for example, a method of assigning, to at least one of application 134, a priority of use of a system resource of the electronic device 101, for example, the bus 110, the processor 120, the memory 130, or the like.

The API 133 is an interface used by the application 134 to control a function provided from the kernel 131 or the middleware 132, and may include, for example, at least one interface or function, for example, an instruction, for a file control, a window control, image processing, a character control, or the like.

According to various embodiments of the present disclosure, the application 134 may include an SMS/MMS application, an e-mail application, a calendar application, an alarm application, a health care application, for example, an application for measuring an amount of exercise or blood sugar, and an environmental information application, for example, an application for providing atmospheric pressure, humidity information, temperature information, and the like. Additionally or alternatively, the application 134 may be an application associated with exchanging of information between the electronic device 102 and an external electronic device, for example, an electronic device 104. The application associated with exchanging of information may include, for example, a notification relay application for transferring predetermined information to an external electronic device or a device management application for managing an external electronic device.

For example, the notification relay application may include a function of transferring, to the external electronic device, for example, the electronic device 104, notification information generated from other applications of the electronic device 102, for example, an SMS/MMS application, an e-mail application, a health care application, an environmental information application, and the like. Additionally or alternatively, the notification relay application may receive notification information from, for example, an external electronic device, for example, the electronic device 104, and may provide the notification information to a user. The device management application may manage (for example, install, delete, or update), for example, a function of at least a part of an external electronic device (for example, the electronic device 104) that communicates with the electronic device 102 (for example, activating/deactivating the external electronic device (or a few components) or adjusting brightness (or resolution) of a display), an application operated in the external electronic device, or a service provided from the external electronic device (for example, a call service or a message service).

According to various embodiments of the present disclosure, the application 134 may include an application designated based on properties (for example, a type of electronic device) of an external electronic device (for example, the electronic device 104). For example, when the external electronic device is an MP3 player, the application 134 may include an application associated with playback of music. Similarly, when the external electronic device is a mobile medical device, the application 134 may include an application associated with health care. According to an embodiment of the present disclosure, the application 134 may include at least one of applications received from an application designated for the electronic device 102 or an application received from an external electronic device (for example, the server 106 or the electronic device 104).

The input/output interface 140 may transfer a command or data input by a user through an input/output device (for example, a sensor, a keyboard, or a touch screen) to the processor 120, the memory 130, the communication interface 160, and the sensor module 170, for example, through the bus 110. For example, the input/output interface 140 may provide, to the processor 120, data associated with a touch of a user input through a touch screen. The input/output interface 140 may output, for example, command or data received through the bus 110 from the processor 120, the memory 130, the communication interface 160, and the sensor module 170, to an input/output device (for example, a speaker or display).

The display 150 may display various pieces of information (for example, multimedia data, text data or the like) to a user.

The communication interface 160 may connect communication between the electronic device 102 and an external electronic device (for example, the electronic device 104 or the server 106). For example, the communication interface 160 may be connected to the network 162 through wireless communication or wired communication, and may communicate with an external device. Wireless communication may include at least one of, for example, Wireless Fidelity (Wifi), Bluetooth (BT), Near Field Communication (NFC), Global Positioning System (GPS) and cellular communication (for example, LTE, LTE-A, CDMA, WCDMA, UMTS, WiBro, GSM or the like). Wired communication may include at least one of a Universal Serial Bus (USB), a High Definition Multimedia Interface (HDMI), Recommended Standard 232 (RS-232), and a Plain Old Telephone Service (POTS).

According to an embodiment of the present disclosure, the network 162 may be a telecommunication network. The telecommunication network may include at least one of a computer network, Internet, Internet of things, and a telephone network. According to an embodiment of the present disclosure, a protocol for communication between the electronic device 102 and an external device (for example, a transport layer protocol, a data link layer protocol or a physical layer protocol) may be supported in at least one of the application 134, the API 133, the middleware 132, the kernel 131, and the communication interface 160.

The sensor module 170 may include a cover sensor 171 and a pose sensor 172. The cover sensor 171 may sense an open and shut state of covers of the electronic device 102. For example, a magnet is installed in one of the covers, and a magnetic sensor such as a hall sensor may be used as the cover sensor 171. The magnet and the magnetic sensor may be installed in corresponding locations where the magnetic sensor is capable of sensing the magnet when the covers are shut. In a case in which the magnet is installed in a cover, and the magnetic sensor is installed in the electronic device 102 as the cover sensor 171, the magnetic sensor may sense the magnet when the cover is shut and the magnetic sensor fails to sense the magnet when the cover is open.

A sensor that is capable of sensing a pose such as a gyro sensor, an acceleration sensor, or the like may be used as the pose sensor 172. The electronic device 102 may sense whether the electronic device 102 is upside down using the pose sensor 172.

According to various embodiments of the present disclosure, a controller may include the processor 120 and the memory 130 for storing information required by the processor 120. The controller, which is a central processing unit, may control general operations of the electronic device 102, and may execute an operation associated with a wireless charging method according to an embodiment of the present disclosure which will be described below.

Figure 2:
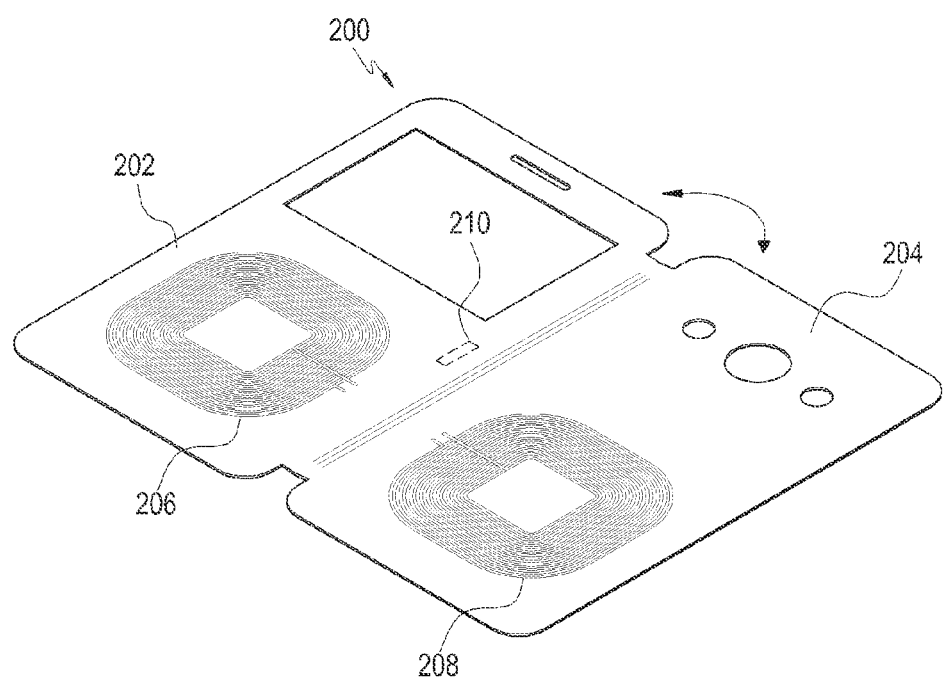
FIG. 2 illustrates a cover member according to various embodiments of the present disclosure.

FIG. 2 illustrates a cover member according to various embodiments of the present disclosure.

Referring to FIG. 2, a cover member 200 may include covers 202 and 204 which are connected to be hinged (e.g., hingedly connected). The cover 202 may be a front side cover, and the cover 204 may be a back side cover. The cover 202 may include a power receiving member 206, and the cover 204 may include a power receiving member 208. The power receiving members 206 and 208 may wirelessly receive power that is wirelessly transmitted from a power transmitting member (not illustrated) of a wireless power transmitter (not illustrated).

When a magnetic sensor is used as the cover sensor 171 of the electronic device, the cover 202 may include a magnet 210 installed in a location that corresponds to the cover sensor 171. The electronic device 102 may sense an open and shut state of the covers 202 and 204 based on whether the cover sensor 171 senses the magnet 210 of the cover 202. The electronic device 102 may determine that the covers 202 and 204 are shut when the cover sensor 171 senses the magnet 210 of the cover 202. The electronic device 102 may determine that the covers 202 and 204 are open when the cover sensor 171 fails to sense the magnet 210 of the cover 202.

According to an embodiment of the present disclosure, the cover 204 may be installed in the back side of the electronic device 102, as the back side cover (or case) of the electronic device 102. According to another embodiment of the present disclosure, a holder may be installed (formed) in the cover 204 and thus, the electronic device 102 may be accepted by the holder.

Figure 3:
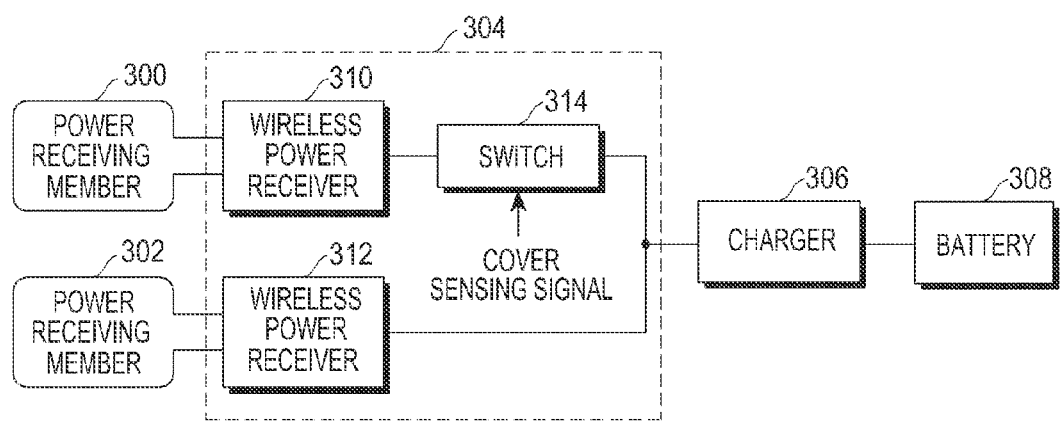
FIG. 3 is a block diagram illustrating wireless power reception and charging according to various embodiments of the present disclosure.

FIG. 3 is a block diagram illustrating wireless power reception and charging according to various embodiments of the present disclosure.

Referring to FIG. 3, power receiving members 300 and 302 and a wireless power receiving unit 304 may be included in the cover member 200 of FIG. 2 according to an embodiment of the present disclosure. The power receiving members 300 and 302 may be the power receiving members 206 and 208 of FIG. 2, respectively. According to an embodiment of the present disclosure, a charger 306 and a battery 308 may be included in the above described electronic device 102 of FIG. 1.

The wireless power receiving unit 304 may wirelessly receive power through at least one of the power receiving members 300 and 302 so as to generate power for charging. The wireless power receiving unit 304 may include wireless power receivers 310 and 312 and a switch 314. The wireless power receiver 310 may wirelessly receive power through the power receiving member 300 so as to generate power for charging. The wireless power receiver 312 may wirelessly receive power through the power receiving member 302 so as to generate power for charging. According to an embodiment of the present disclosure, the wireless power receiving unit 304 may be included in one of the covers 202 and 204. According to another embodiment of the present disclosure, the wireless power receiver 310 may be included in the cover 202, and the wireless power receiver 312 may be included in the cover 204.

Each of the wireless power receivers 310 and 312 may input power received through a correspondingly connected power receiving member among the power receiving members 300 and 302. The wireless power receivers 310 and 312 may rectify and execute DC/DC converting input power in the same manner as a general wireless power receiver, so as to generate power for charging, having a predetermined voltage. The wireless power receivers 310 and 312 may communicate with a wireless power transmitter in the same manner as a general wireless power receiver. The power for charging generated by wireless power receivers 310 and 312 may be provided to the charger 306.

The switch 314 may be connected between the wireless power receiver 310 and the charger 306. The switch 314 may turn on or off a path between the wireless power receiver 310 and the charger 306 to correspond to an open or shut state of the covers 202 and 204 of FIG. 2 which is sensed by the cover sensor 171 of FIG. 1. The switch 314 may be included in one of the covers 202 and 204, or may be included in the electronic device 102. According to an embodiment of the present disclosure, the switch 314 may be turned on or off based on a cover sensing signal of the cover sensor 171, which indicates an open or shut state of the covers 202 and 204. According to another embodiment of the present disclosure, the switch 314 may be turned on or off based on a control of the controller of the electronic device 102 that senses an open or shut state of the covers 202 and 204 based on a cover sensing signal of the cover sensor 171. The switch 314 may be turned on when the covers 202 and 204 are open and may be turned off when the covers 202 and 204 are shut.

When the covers 202 and 204 are open, the switch 314 is turned on and thus, the path between the wireless power receiver 310 and the charger 306 may be connected. Therefore, when the covers 202 and 204 are open, the power for charging generated by both the wireless power receivers 310 and 312 may be provided to the charger 306.

When the covers 202 and 204 are shut, the switch 314 is turned off and thus, the path between the wireless power receiver 310 and the charger 306 may be blocked. Therefore, when the covers 202 and 204 are shut, the power for charging generated by the wireless power receiver 312 may be provided to the charger 306. In this instance, the switch 314 is turned off and thus, power for charging generated by the wireless power receiver 312 is prevented from being provided to the wireless power receiver 310.

Accordingly, power for charging may be generated from power wirelessly received through at least one of the power receiving members 300 and 302. Therefore, the charger 306 may charge the battery 308 with power for charging generated by at least one of the wireless power receivers 310 and 312.

Therefore, the electronic device 102 may wirelessly charge through the back side of the electronic device 102 when the covers 202 and 204 are shut, and may simultaneously execute wireless charging through both sides of the electronic device 102, that is, the front side and the back side of the electronic device 102 when the covers 202 and 204 are open.

Figure 4:
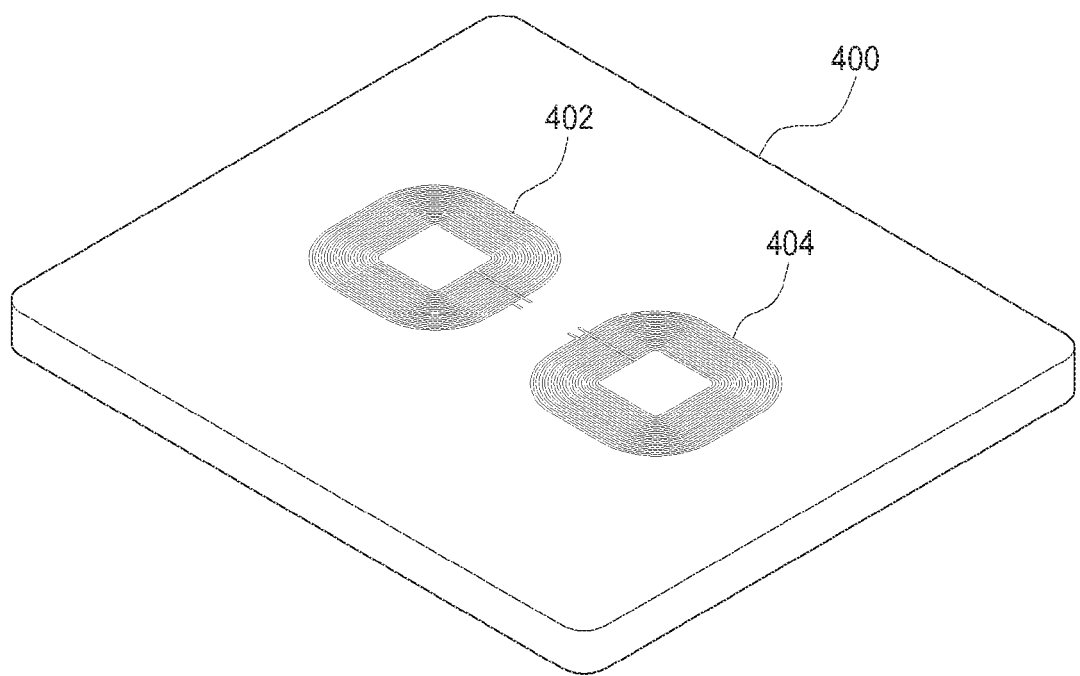
FIG. 4 illustrates a wireless power transmitting pad according to various embodiments of the present disclosure.

FIG. 4 illustrates a wireless power transmitting pad applicable to various embodiments of the present disclosure.

Referring to FIG. 4, a wireless power transmitting pad 400 includes power transmitting members 402 and 404. The power transmitting members 402 and 404 wirelessly transmit power input from a wireless power transmitter (not illustrated). The power transmitting members 402 and 404 may be installed in locations that respectively oppose the power receiving members 206 and 208 of FIG. 2. The wireless power transmitting pad 400 may be implemented by, for example, the technology disclosed in US patent application publication number US 2013/0099730 A1, "MULTI WIRELESS CHARGING APPARATUS AND METHOD FOR MANUFACTURING THE SAME", which was invented by Young Seok, Yoon and published on Apr. 25, 2013. The US patent application publication number US 2013/0099730 A1 discloses the technology in which a plurality of wireless charging units simultaneously transmit power to a plurality of wireless charging receivers.

When the electronic device 102 of which the covers 202 and 204 are open is put on the wireless power transmitting pad 400, the electronic device 102 may be wirelessly charged through both the front side and the back side of the electronic device 102. Also, when the back side of the electronic device 102 of which the covers 202 and 204 are shut is put on the wireless power transmitting pad 400, the electronic device 102 may be wirelessly charged through the back side of the electronic device 102.

Figure 5:
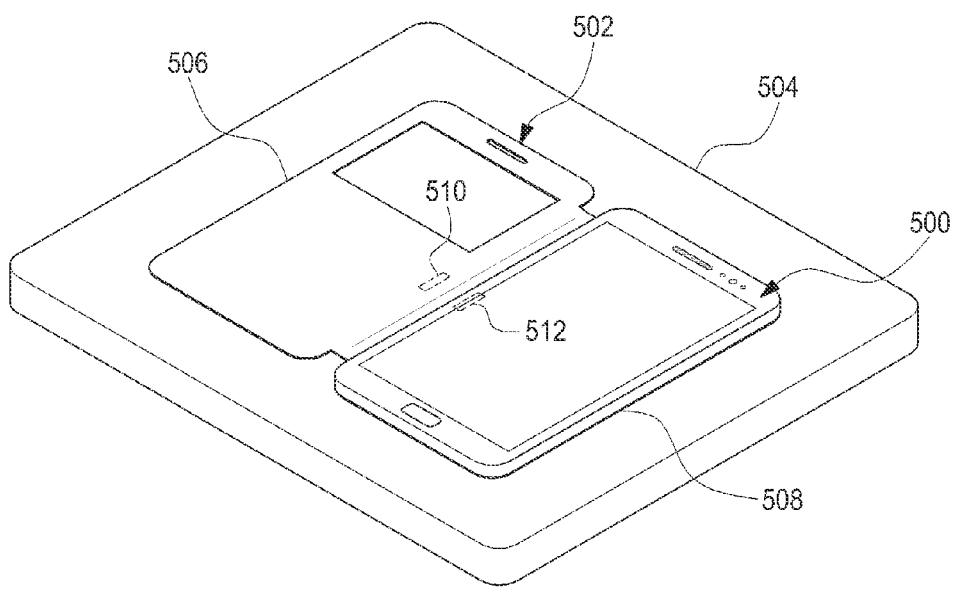
FIG. 5 illustrates a situation in which charging occurs through both sides of the electronic device according to various embodiments of the present disclosure.

FIG. 5 illustrates a situation in which charging occurs through both sides of the electronic device according to various embodiments of the present disclosure.

Referring to FIG. 5, an electronic device 500 of which covers 506 and 508 of a cover member 502 are shut lies on a charging pad 504. The electronic device 500 may be the electronic device 102 of FIG. 1, and the covers 506 and 508 of the cover member 502 may be the covers 202 and 204 of the cover member 200 of FIG. 2, respectively, and the charging pad 504 may be the charging pad 400 of FIG. 4. A magnet 510 installed in the cover 506 may be the magnet 210 of FIG. 2, and a cover sensor 512 installed in the electronic device 500 may be the cover sensor 171 of FIG. 1.

As illustrated in FIG. 5, the electronic device 500 may execute wireless charging simultaneously through both the front side and the back side of the electronic device 500 when the covers 506 and 508 are open.

Figure 6:
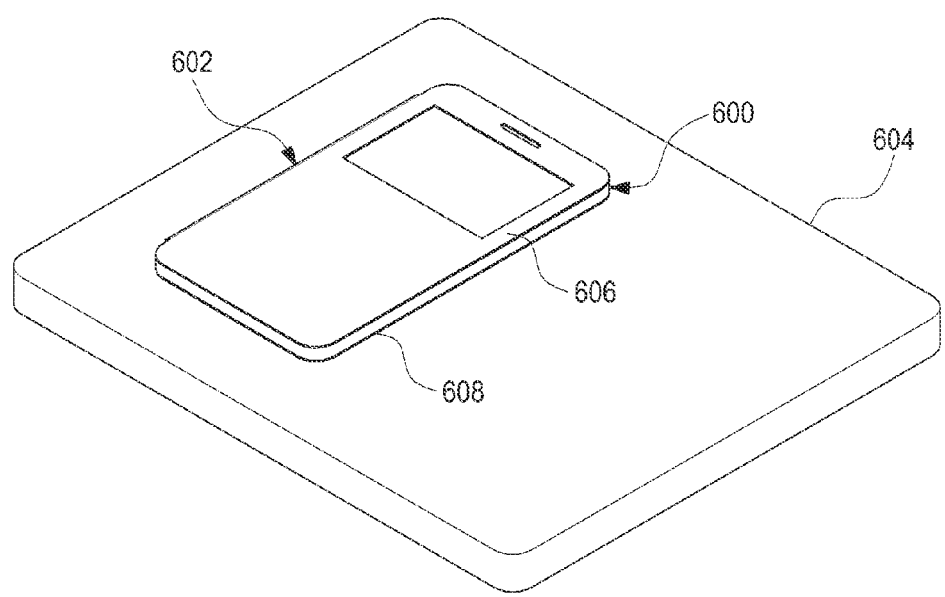
FIG. 6 illustrates a situation in which charging occurs through the back side of the electronic device according to various embodiments of the present disclosure.

FIG. 6 illustrates a situation in which charging occurs through the back side of the electronic device according to various embodiments of the present disclosure.

Referring to FIG. 6, an electronic device 600 of which covers 606 and 608 of a cover member 602 are shut lies on a charging pad 604. The electronic device 600 may be the electronic device 102 of FIG. 1, and the covers 606 and 608 of the cover member 602 may be the covers 202 and 204 of the cover member 200 of FIG. 2, respectively, and the charging pad 604 may be the charging pad 400 of FIG. 4.

As illustrated in FIG. 6, the electronic device 600 may execute wireless charging through the back side of the electronic device 600 when the covers 606 and 608 are shut.

A cover member of an electronic device according to various embodiments of the present disclosure may include covers connected to be hinged (e.g., hingedly connected), and each cover may include a power receiving member for wirelessly receiving power.

According to an embodiment of the present disclosure, a cover member may include a wireless power receiving unit that receives power through at least one power receiving member and generates power for charging.

According to an embodiment of the present disclosure, a wireless power receiving unit may include wireless power receivers that are respectively connected with power receiving members and receive power through a correspondingly connected power receiving member and generate power for charging. According to an embodiment of the present disclosure, a wireless power receiving unit may be included in one of covers. According to an embodiment of the present disclosure, each of wireless power receivers may be included in a corresponding cover among covers.

A cover member according to an embodiment of the present disclosure may further include a switch that turns on or off a path between a charger and a wireless power receiver connected to a power receiving member included in the front side cover among covers, to correspond to an open or shut state of the covers, wherein the wireless power receivers are connected to the charger that charges a battery. According to an embodiment of the present disclosure, a switch may be turned on when covers are open and may be turned off when the covers are shut.

According to an embodiment of the present disclosure, the back side cover of the covers may be installed in an electronic device as the back side cover of the electronic device.

An electronic device according to various embodiments of the present disclosure may include a charger that charges a battery with power for charging generated by at least one of the wireless power receivers that wirelessly receive power respectively through the power receiving members respectively included in covers connected to be hinged and generate power for charging.

According to an embodiment of the present disclosure, an electronic device may include a cover sensor that senses an open and shut state of covers, and a switch that turns on or off a path between a charger and a wireless power receiver connected with a power receiving member included in the front side cover of the covers, to correspond to the open or shut state of the covers. According to an embodiment of the present disclosure, a switch may be turned on when covers are open and may be turned off when the covers are shut.

Figure 7:
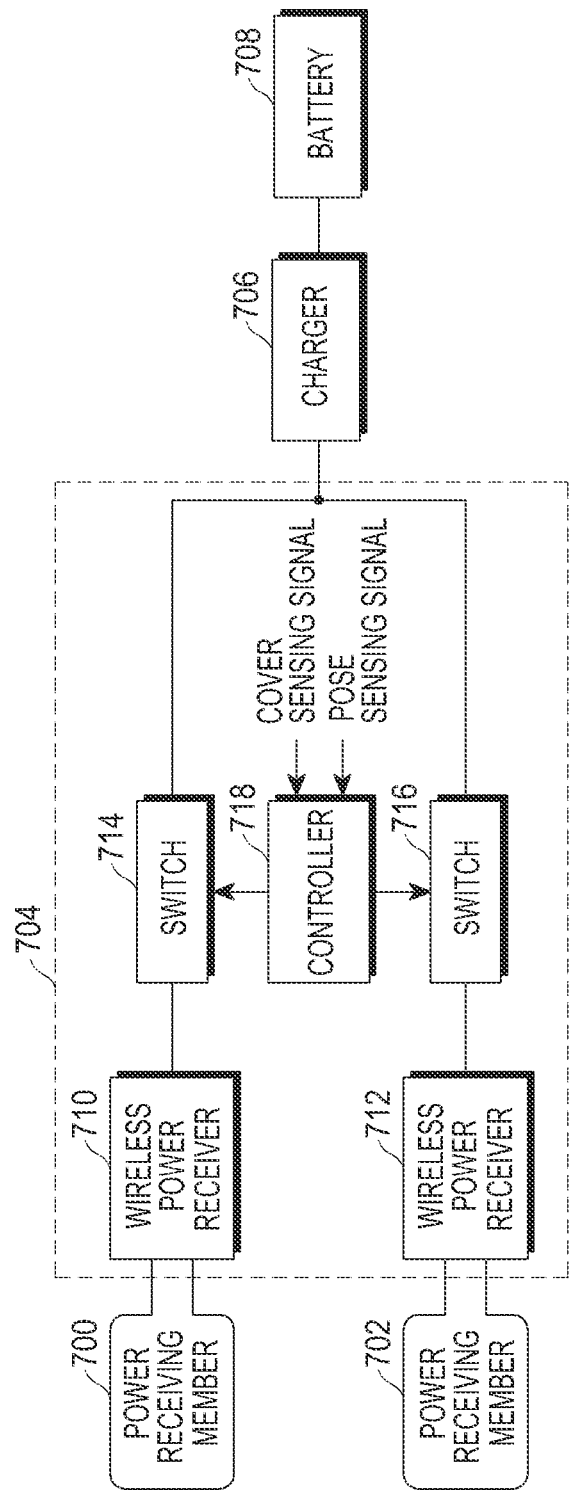
FIG. 7 is a block diagram illustrating wireless power reception and charging according to various embodiments of the present disclosure.

FIG. 7 is a block diagram illustrating wireless power reception and charging according to various embodiments of the present disclosure.

Referring to FIG. 7, power receiving members 700 and 702 and a wireless power receiving unit 704 may be included in the cover member 200 of FIG. 2 according to an embodiment of the present disclosure. The power receiving members 700 and 702 may be the power receiving members 206 and 208 of FIG. 2, respectively. According to an embodiment of the present disclosure, a charger 706 and a battery 708 may be included in the above described electronic device 102 of FIG. 1.

The wireless power receiving unit 704 may wirelessly receive power through at least one of the power receiving members 700 and 702 so as to generate power for charging. The wireless power receiving unit 704 may include wireless power receivers 710 and 712, switches 714 and 716, and a controller 718. The wireless power receiver 710 may wirelessly receive power through the power receiving member 700 so as to generate power for charging. The wireless power receiver 712 may wirelessly receive power through the power receiving member 702 so as to generate power for charging. According to an embodiment of the present disclosure, the wireless power receiving unit 704 may be included in one of the covers 202 and 204. According to another embodiment of the present disclosure, the wireless power receiver 710 may be included in the cover 202, and the wireless power receiver 712 may be included in the cover 204.

The wireless power receivers 710 and 712 may input power received through a correspondingly connected power receiving member among the power receiving members 700 and 702. The wireless power receivers 710 and 712 may rectify and execute DC/DC converting input power in the same manner as a general wireless power receiver, so as to generate power for charging, having a predetermined voltage. The wireless power receivers 710 and 712 may communicate with a wireless power transmitter in the same manner as a general wireless power receiver. The power for charging generated by wireless power receivers 710 and 712 may be provided to the charger 706.

The switch 714 may be connected between the wireless power receiver 710 and the charger 706. The switch 714 may turn on or off a path between the wireless power receiver 710 and the charger 706. The switch 714 may be included in one of the covers 202 and 204, or may be included in the electronic device 102. According to an embodiment of the present disclosure, the switch 714 may be turned on or off by the controller 718.

The switch 716 may be connected between the wireless power receiver 712 and the charger 706. The switch 716 may turn on or off a path between the wireless power receiver 712 and the charger 706. The switch 716 may be included in one of the covers 202 and 204, or may be included in the electronic device 102. According to an embodiment of the present disclosure, the switch 716 may be turned on or off by the controller 718.

The controller 718 may turn on or off the switches 714 and 716 based on an open or shut state of the covers 202 and 204 and an overturn state of the electronic device 102, so as to control on or off of the switches 714 and 716. The controller 718 may be included in one of the covers 202 and 204, or may be included in the electronic device 102. According to an embodiment of the present disclosure, the controller 718 may input a cover sensing signal of the cover sensor 171 indicating an open or shut state of the covers 202 and 204, and a pose sensing signal of the pose sensor 172 indicating whether the electronic device 102 is upside down. According to an embodiment of the present disclosure, the controller of the electronic device 102 may be used or a separate controller may be embodied as the controller 718.

The controller 718 may turn on all of the switches 714 and 716 when the covers 202 and 204 are open. Therefore, the paths between the charger 706 and the wireless power receivers 710 and 712 are connected and thus, power for charging generated by both the wireless power receivers 710 and 712 may be provided to the charger 706.

The controller 718 may turn the switch 714 on and turn the switch 716 off when the covers 202 and 204 are shut and the electronic device 102 is upside down. Accordingly, the path between the wireless power receiver 710 and the charger 706 may be connected and the path between the wireless power receiver 712 and the charger 706 may be blocked. Therefore, when the covers 202 and 204 are shut and the electronic device 102 is upside down, the power for charging generated by the wireless power receiver 710 may be provided to the charger 706. In this instance, the switch 716 is turned off and thus, power for charging generated by the wireless power receiver 710 is prevented from being provided to the wireless power receiver 712.

The controller 718 may turn the switch 714 off and turn the switch 716 on when the covers 202 and 204 are shut and the electronic device 102 is not overturned. Accordingly, the path between the wireless power receiver 712 and the charger 706 may be connected and the path between the wireless power receiver 710 and the charger 706 may be blocked. Therefore, when the covers 202 and 204 are shut and the electronic device 102 is not overturned, the power for charging generated by the wireless power receiver 712 may be provided to the charger 706. In this instance, the switch 714 is turned off and thus, power for charging generated by the wireless power receiver 712 is prevented from being provided to the wireless power receiver 710.

Accordingly, power for charging may be generated from power wirelessly received through at least one of the power receiving members 700 and 702. Therefore, the charger 706 may charge the battery 708 with power for charging generated by at least one of the wireless power receivers 710 and 712.

Therefore, the electronic device 102 may execute wireless charging through the back side of the electronic device 102 as described with reference to FIG. 6 when the covers 202 and 204 are shut and the electronic device 102 is not overturned. The electronic device 102 may execute wireless charging through the front side of the electronic device 102 as described in the followings when the covers 202 and 204 are shut and the electronic device 102 is upside down. The electronic device 102 may execute wireless charging simultaneously through both the front side and the back side of the electronic device 102 when the covers 202 and 204 are open as described with reference to FIG. 5.

A cover member according to various embodiments of the present disclosure may include a first switch that turns on or off a path between a charger and a wireless power receiver connected to a power receiving member included in the front side cover among the covers, a second switch that turns on or off a path between the charger and a wireless power receiver connected to a power receiving member included in the back side cover among the covers, and a controller that controls turn on or off of the first switch and the second switch based on an open or shut state of the covers and an overturn state of the electronic device, wherein the wireless power receivers are connected to the charger that charges a battery.

An electronic device according to various embodiments of the present disclosure may include a first switch that turns on or off a path between a charger and a wireless power receiver connected to a power receiving member included in the front side cover among the covers, a second switch that turns on or off a path between the charger and a wireless power receiver connected to a power receiving member included in the back side cover among the covers, a cover sensor that senses an open and shut state of the covers, a pose sensor that senses whether the electronic device is upside down, and a controller that controls turn on or off of the first switch and the second switch based on an open or shut state of the covers and an overturn state of the electronic device.

According to an embodiment of the present disclosure, a controller may turn on both a first switch and a second switch when covers are open, and may turn the first switch on and turn the second switch off when the covers are shut and an electronic device is upside down, and may turn the first switch off and turn the second switch on when the covers are shut and the electronic device is not overturned.

Figure 8:
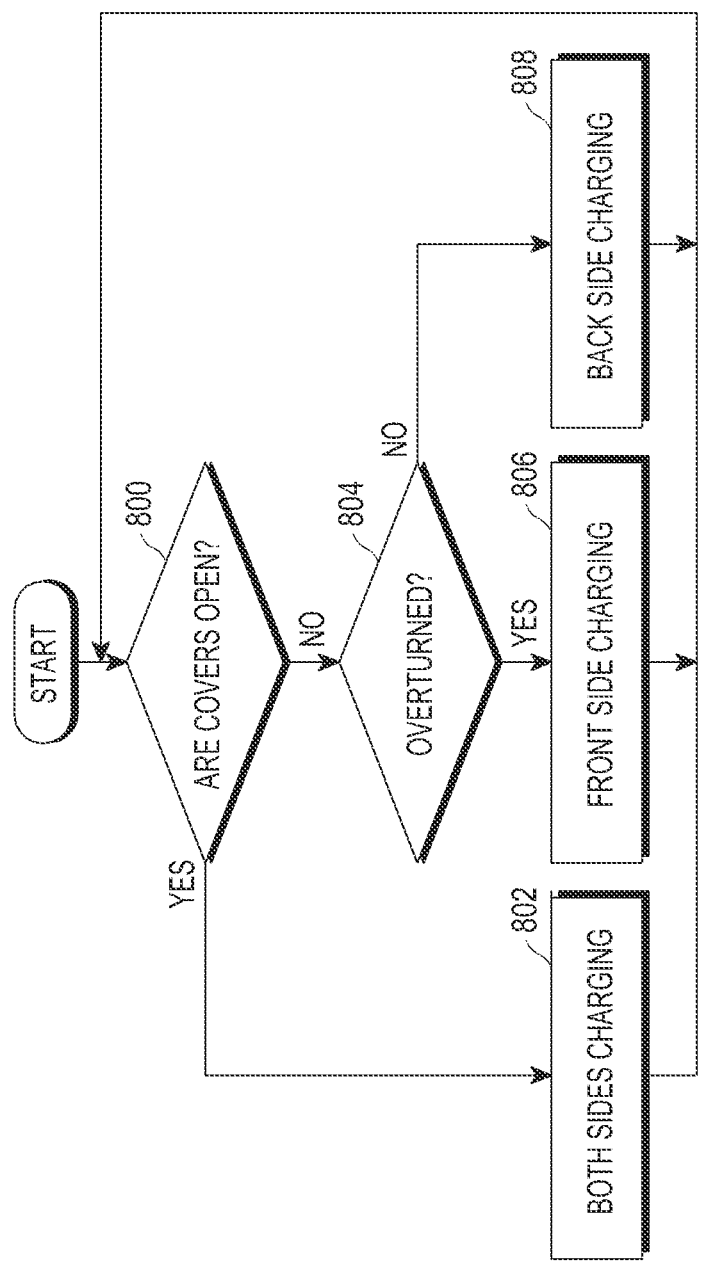
FIG. 8 is a flowchart of a process of controlling wireless charging according to various embodiments of the present disclosure.

FIG. 8 is a flowchart of a process of controlling wireless charging according to various embodiments of the present disclosure.

Referring to FIG. 8, the controller 718 may determine whether the covers 202 and 204 are open through the cover sensor 171 in operation 800. In operation 802 the controller 718 may turn on both of the switches 714 and 716 when the covers 202 and 204 are open. Accordingly, charging may be executed through both sides of the electronic device 102.

When it is determined that the covers 202 and 204 are shut in operation 800, the controller 718 may determine whether the electronic device 102 is upside down (e.g., overturned) through the pose sensor 172 in operation 804. When it is determined that the electronic device 102 is overturned (e.g., upside down) in operation 804, the controller 718 may turn the switch 714 on and turn the switch 716 off in operation 806. Accordingly, charging may be executed through the front side of the electronic device 102.

When it is determined that the electronic device 102 is not overturned in operation 804, the controller 718 may turn the switch 714 off and turn the switch 716 on in operation 808. Accordingly, charging may be executed through the back side of the electronic device 102.

Figure 9:
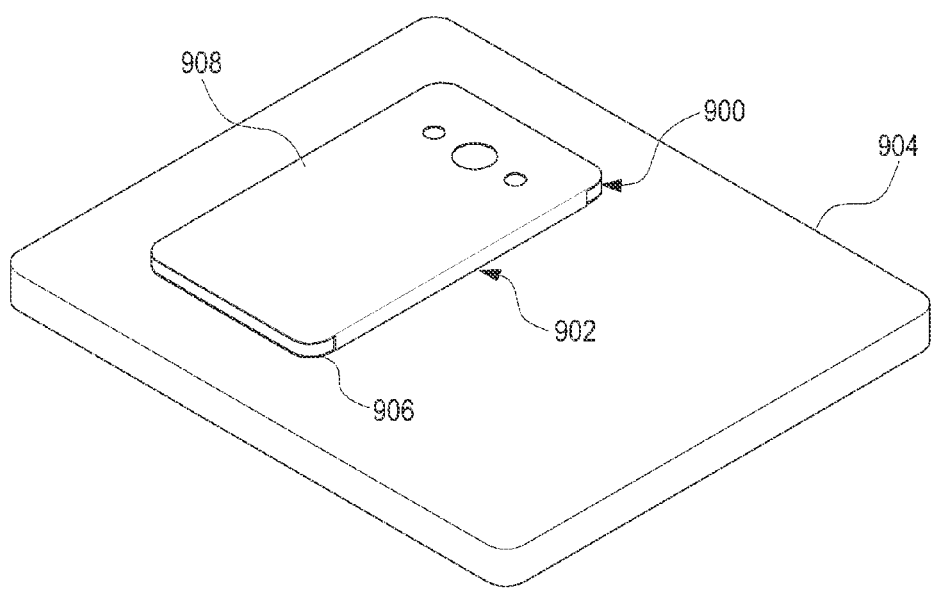
FIG. 9 illustrates a situation in which charging occurs through the front side of the electronic device according to various embodiments of the present disclosure.

FIG. 9 illustrates a situation in which charging occurs through the front side of the electronic device according to various embodiments of the present disclosure.

Referring to FIG. 9, an electronic device 900 of which covers 906 and 908 of a cover member 902 are shut lies on a charging pad 904. The electronic device 900 may be the electronic device 102 of FIG. 1, and the covers 906 and 908 of the cover member 902 may be the covers 202 and 204 of the cover member 200 of FIG. 2, respectively, and the charging pad 904 may be the charging pad 400 of FIG. 4.

As illustrated in FIG. 9, the electronic device 900 may execute wireless charging through the front side of the electronic device 900 when the covers 906 and 908 are shut and the electronic device 900 is upside down.

A wireless charging method of an electronic device according to various embodiments of the present disclosure may include generating power for charging through power wirelessly received through at least one of power receiving members respectively included in covers connected to be hinged, and charging a battery with power for charging.

Generating the power for charging may include sensing an open or shut state of the covers, and generating power for charging using at least one power receiving member that corresponds to an open or shut state of the covers from among the power receiving members.

Generating power for charging using the power receiving member may include generating power for charging from power wirelessly received through all of the power receiving members when the covers are open, and generating power for charging from power wirelessly received through a power receiving member included in a cover used as the back side cover among the covers when the covers are shut.

Generating the power for charging may include sensing an open or shut state of the covers, sensing whether the electronic device is upside down, and generating power for charging using at least one power receiving member that corresponds to an open or shut state of the covers and the overturn state of the electronic device from among the power receiving members.

Generating power for charging using the power receiving member may include generating power for charging using all of the power receiving members when the covers are open, generating power for charging using a power receiving member included in a cover used as the front side cover among the covers when the covers are shut and the electronic device is upside down, and generating power for charging using a power receiving member included in a cover used as the back side cover among the covers when the covers are shut and the electronic device is not overturned.

According to various embodiments of the present disclosure, wireless charging may be executed through arbitrary one or both of the front side and the back side of the electronic device. Therefore, wireless charging may be executed irrespective of the electric device being upside down. When charging is executed simultaneously through both sides of the electronic device, a charging time may be reduced when compared to charging through one side of the electronic device.

Figure 10:
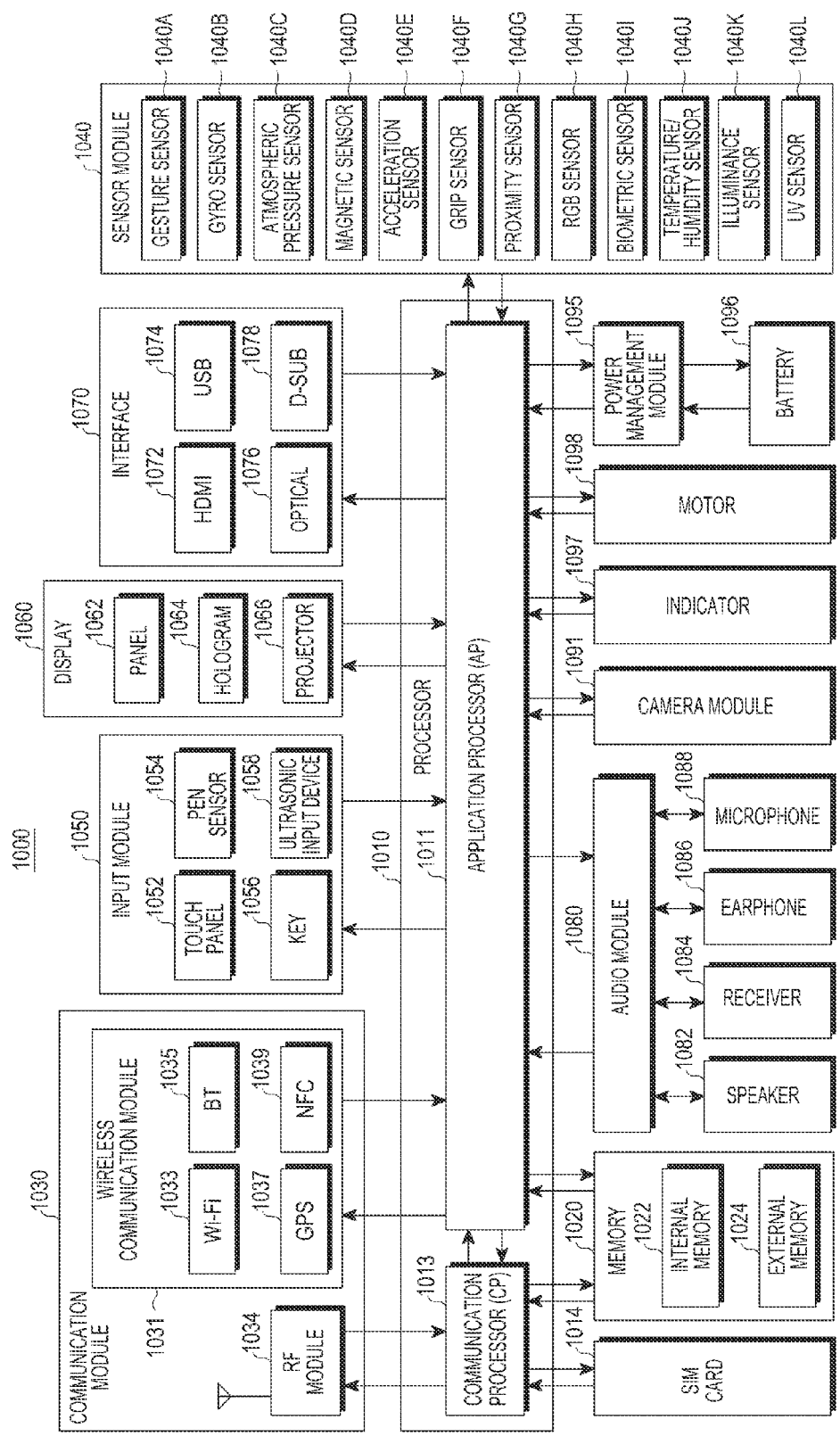
FIG. 10 is a block diagram of a detailed structure of an electronic device according to various embodiments of the present disclosure.

FIG. 10 is a block diagram of a detailed structure of an electronic device according to various embodiments of the present disclosure. An electronic device 1000 of FIG. 10 may form, for example, a part or the entirety of the electronic device 102 of FIG. 1.

Referring to FIG. 10, the electronic device 1000 may include at least one processor 1010, a Subscriber Identification Module (SIM) card 1014, a memory 1020, a communication module 1030, a sensor module 1040, an input module 1050, a display 1060, an interface 1070, an audio module 1080, a camera module 1091, a power management module 1095, a battery 1096, an indicator 1097, or a motor 1098.

The processor 1010 may include one or more Application Processors (AP) 1011 or one or more Communication Processors (CP) 1013. The processor 1010 may be, for example, the processor 120 of FIG. 1. Although it is illustrated that the AP 1011 and the CP 1013 are included in the processor 1010 in FIG. 10, the AP 1011 and the CP 1013 may be included in different IC packages. According to an embodiment of the present disclosure, the AP 1011 and the CP 1013 may be included in a single IC package.

The AP 1011 may run an operation system or an application program so as to control a plurality of hardware or software elements connected to the AP 1011, and may execute data processing and operation associated with various data including multimedia data. The AP 1011 may be embodied as, for example, a System on Chip (SoC). According to an embodiment of the present disclosure, the processor 1010 may further include a Graphic Processing Unit (GPU) (not illustrated).

The CP 1013 may manage a data link in communication between the electronic device 1000 and other electronic devices connected over a network, and may convert a communication protocol. The CP 1013 may be embodied as, for example, a SoC. According to an embodiment of the present disclosure, the CP 1013 may execute at least a portion of a multimedia controlling function. The CP 1013 may identify and authenticate the electronic device 1000 in a communication network using a Subscriber Identification Module (for example, a SIM card 1014). Further, the CP 1013 may provide a user with services, such as a voice call service, a video call service, a text message service, a packet data service, and the like.

Also, the CP 1013 may control data transmission and reception of the communication module 1030. Although the elements such as the CP 1013, the power management module 1095, or the memory 1020 are illustrated as separate elements, the AP 1011 may be embodied to include at least a few of the described elements, for example, the CP 1013.

According to an embodiment of the present disclosure, the AP 1011 or the CP 1013 may load a command or data received from at least one of non-volatile memory and other elements connected to each entity in a volatile memory, and may process the same. Also, the AP 1011 or the CP 1013 may store, in a non-volatile memory, data that may be received from or generated by at least one of other element.

The SIM card 1014 may be a card that is implemented as a subscriber identifying module, and may be inserted into a slot formed in a predetermined location of the electronic device 1000. The SIM card 1014 may include a unique identification information such as an Integrated Circuit Card Identifier (ICCID), or subscriber information such as International Mobile Subscriber Identity (IMSI).

The memory 1020 may include an internal (e.g., embedded) memory 1022 and an external memory 1024. The memory 1020 may be, for example, the memory 130 of FIG. 1. The internal memory 1022 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like). According to an embodiment of the present disclosure, the embedded memory 1022 may be a Solid State Drive (SSD). The external memory 1024 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 1024 may be functionally connected to the electronic device 1000 through various interfaces.

Although not illustrated, the electronic device 1000 may further include a storage device (or a storage medium) such as a hard disk drive.

The communication module 1030 may include a wireless communication module 1031 or a Radio Frequency (RF) module 1034. The communication module 1030 may be included in, for example, the communication interface 160 of FIG. 1. The wireless communication module 1031 may include, for example, Wi-Fi 1033, BlueTooth (BT) 1035, a Global Positioning System (GPS) 1037, or a Near Field Communication (NFC) 1039. For example, the wireless communication module 1031 may provide a wireless communication function using a wireless frequency. Additionally or alternatively, the wireless communication module 1031 may include a network interface (for example, a LAN card), a modem or the like for connecting the electronic device 1000 to a network (for example, Internet, a Local Area Network (LAN), a Wireless Area Network (WAN), a communication network, a cellular network, a satellite network, or a Plain Old Telephone Service (POTS), and the like).

The RF module 1034 may process transmission and reception of a voice or data signal. The RF module 1034 may include, for example, a transceiver, a Power Amp Module (PAM), a frequency filter, a Low Noise Amplifier (LNA), or the like, although not illustrated. Also, the RF module 1034 may further include a component for transmitting and receiving an electromagnetic wave in a free air space in wireless communication, for example, a conductive substance, a conductive wire, or the like.

The sensor module 1040 may include at least one of, for example, a gesture sensor 1040A, a gyro sensor 1040B, an atmospheric pressure sensor 1040C, a magnetic sensor 1040D, an acceleration sensor 1040E, a grip sensor 1040F, a proximity sensor 1040G, a Red, Green and Blue (RGB) sensor 1040H, a biometric sensor 10401, a temperature/humidity sensor 1040J, an illuminance sensor 1040K, an Ultra Violet (UV) sensor 1040L, and an InfraRed (IR) sensor (not illustrated). The sensor module 1040 measures a physical quantity or senses an operation state of an electronic device, so as to convert the measured or sensed information into an electric signal. Additionally or alternatively, the sensor module 1040 may include, for example, an olfactory sensor (E-nose sensor; not illustrated), an ElectroMyoGraphy sensor (EMG sensor; not illustrated), an ElectroEncephaloGram sensor (EEG; not illustrated), an ElectroCardioGram sensor (ECG; not illustrated), a fingerprint sensor, or the like. The sensor module 1040 may further include a control circuit for controlling one or more sensors included therein.

The input module 1050 may include a touch panel 1052, a (digital) pen sensor 1054, a key 1056, or an ultrasonic input device 1058. The input module 1050 may be included in, for example, the input/output interface 140 of FIG. 1. The touch panel 1052 may recognize a touch input based on, for example, at least one of a capacitive scheme, a resistive scheme, an infrared scheme, and an acoustic wave scheme. Also, the touch panel 1052 may further include a controller (not illustrated). The capacitive scheme may recognize physical contact, in addition to proximity. The touch panel 1052 may further include a tactile layer function. In this case, the touch panel 1052 may provide a user with a tactile reaction.

The (digital) pen sensor 1054 may be embodied, for example, using a method identical or similar to a method of receiving a touch input of a user, or using a separate recognition sheet. The key 1056 may include, for example, a physical button. Also, for example, an optical key, a key pad, or a touch key may be included. The ultrasonic input device 1058 is a device that may input data through an input instrument that generates an ultrasonic signal so that the electronic device 1000 determines data by sensing a sound wave using a microphone (for example, the microphone 1088), and thereby may be capable of wireless recognition. According to an embodiment of the present disclosure, the electronic device 1000 may use a communication module 1030 to receive a user input from an external device connected thereto (for example, a network, a computer, or a server).

The display 1060 may include a panel 1062, a hologram 1064, or a projector 1066. The display 1060 may be, for example, the display 150 of FIG. 1. The panel 1062 may be, for example, a Liquid Crystal Display (LCD), an Active Matrix Organic Light Emitting Diode (AM-OLED), or the like. The panel 1062 may be implemented to be, for example, flexible, transparent, or wearable. The panel 1062 may be formed to be a single module with the touch panel 1052. The hologram 1064 may show a three-dimensional image in the air using interference of light. The projector 1066 shows an image on an external screen using projection of light. According to an embodiment of the present disclosure, the display 1060 may further include a control circuit for controlling the panel 1062, the hologram 1064, or the projector 1066.

The interface 1070 may include, for example, a High-Definition Multimedia Interface (HDMI) 1072, a Universal Serial Bus (USB) 1074, Optical communication 1076, or D-subminiature (D-sub) 1078. The communication module 1030 may be included in, for example, the communication interface 160 of FIG. 1. Additionally or alternatively, the interface 1070 may include, for example, Secure Digital (SD)/Multi-Media Card (MMC; not illustrated) or Infrared Data Association (IrDA; not illustrated).

The audio module 1080 may bilaterally convert sound and an electronic signal. The audio module 1080 may be included in, for example, the input/output interface 140 of FIG. 1. The audio module 1080 may process, for example, sound information input or output through a speaker 1082, a receiver 1084, an earphone 1086, a microphone 1088 or the like.

The camera module 1091 is a device for capturing an image or a video, and, according to an embodiment of the present disclosure, may include one or more image sensors (for example, a front side sensor or a back side sensor), a lens, an Image Signal Processor (ISP) (not illustrated), or a flash (not illustrated) (for example, an LED or xenon lamp).

The power management module 1095 may manage power of the electronic device 1000. Although not illustrated, the power management module 1095 may include, for example, a Power Management Integrated Circuit (PMIC), a charger Integrated Circuit (IC), or a battery fuel gauge.

The PMIC may be mounted in, for example, an integrated circuit or a SoC semiconductor. Charging methods may be classified into a wired charging method and a wireless charging method. The charger IC may charge a battery and may prevent introduction of over-voltage or over-current from a charger. According to an embodiment of the present disclosure, the charger IC may include a charger IC for at least one of the wired charging method and the wireless charging method. A magnetic resonance scheme, a magnetic induction scheme, an electromagnetic scheme and the like may be exemplified as the wireless charging method, and an additional circuit for wireless charging, such as a coil loop circuit, a resonance circuit, a rectifier circuit, and the like may be added.

The battery gauge may measure, for example, a residual quantity of the battery 1096, and a voltage, a current, or a temperature during the charging. The battery 1096 may store electricity and supply power. The battery 1096 may include, for example, a rechargeable battery or a solar battery.

The indicator 1097 may display a predetermined state of the electronic device 1000 or a part of the electronic device 1000 (for example, the AP 1011), such as a boot-up state, a message state, a charging state, or the like. The motor 1098 may convert an electric signal into mechanical vibration.

Although not illustrated, the electronic device 1000 may include a processing device (for example, a GPU) for supporting a mobile TV. The processing device for supporting the mobile TV may process, for example, media data associated with the standard of Digital Multimedia Broadcasting (DMB), Digital Video Broadcasting (DVB), a media flow, or the like.

The described elements of an electronic device according to various embodiments of the present disclosure may be formed of one or more components, and a name of a corresponding element may be changed based on a type of electronic device. An electronic device according to various embodiments of the present disclosure may be formed to include at least one of the described elements, and a few elements may be omitted or additional elements may be further included. Also, a few of elements of an electronic device according to various embodiments of the present disclosure are coupled to form a single entity, and may equivalently execute functions of the corresponding elements which are not coupled.

The "module" used in various embodiments of the present disclosure may refer to, for example, a "unit" including one of hardware, software, and firmware, or a combination of two or more of the hardware, software, and firmware. The "module" may be interchangeable with a term, such as a unit, a logic, a logical block, a component, or a circuit. The "module" may be a minimum unit of an integrated element or a part thereof The "module" may be a minimum unit for performing one or more functions or a part thereof The "module" may be mechanically or electronically implemented. For example, the "module" according to various embodiments of the present disclosure may include at least one of an Application-Specific Integrated Circuit (ASIC) chip, a Field-Programmable Gate Arrays (FPGAs), and a programmable-logic device for performing operations which have been known or are to be developed hereafter.

According to various embodiments of the present disclosure, at least part of a device (for example, modules or functions thereof) or a method (for example, operations) according to the various embodiments of the present disclosure may be embodied by, for example, an instruction stored in a computer readable storage medium provided in a form of a programming module. When the instruction is executed by at least one processor (for example, the processor 120), the at least one processor may execute a function corresponding to the instruction. The computer-readable storage medium may be, for example, the memory 130. At least a part of the programming module may be implemented (for example, executed) by, for example, the processor 120. At least a part of the programming module may include, for example, a module, a program, a routine, a set of instructions and/or a process for performing one or more functions.

The computer readable recoding medium may include magnetic media, such as a hard disk, a floppy disk and a magnetic tape, optical media, such as a Compact Disc Read Only Memory (CD-ROM) and a Digital Versatile Disc (DVD), magneto-optical media, such as a floptical disk, and a hardware device specially configured to store and execute a program instruction (for example, a programming module), such as a Read Only Memory (ROM), a Random Access Memory (RAM), a flash memory, and the like. In addition, the program instruction may include high class language codes, which may be executed in a computer by using an interpreter, as well as machine codes made by a compiler. The aforementioned hardware device may be configured to operate as one or more software modules in order to perform the operation of various embodiments of the present disclosure, and vice versa.

An electronic device according to an embodiment of the present disclosure may receive a program including instructions that instruct the electronic device to execute a wireless charging method, from a wiredly or wirelessly connected program providing device, and may save the same, and an electronic device of FIG. 1 or a server may be a program providing device. The program providing device may include a memory for storing the program, a communication module to execute wired or wireless communication with an electronic device, and a processor that transmits a corresponding program to the electronic device automatically or in response to the electronic device.

A module or a programming module according to various embodiments of the present disclosure may include at least one of the described elements, a few elements may be omitted, or additional other elements may be additionally included. Operations executed by a module, a programming module, or other component elements according to various embodiments of the present disclosure may be executed sequentially, in parallel, repeatedly, or in a heuristic manner.

Also, a few operations may be executed based on a different order, may be omitted, or may additionally include another operation.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A cover member of an electronic device, the cover member comprising:
   a first side cover and a second side cover hingedly connected
   that include a power receiving member configured to wirelessly receive power, respectively; and
   a wireless power receiving unit that receives power through at least one of the power receiving members and generates power for charging,
   wherein, when the first side cover and the second side cover are shut, the first side cover covers a front side surface of the electronic device and the second side cover covers a back side surface of the electronic device,
   wherein the wireless power receiving unit comprises wireless power receivers that are respectively connected with the power receiving members, receive power through correspondingly connected power receiving members, and generate the power for charging,
   wherein the wireless power receivers are connected to a charger that charges a battery, and
   wherein the wireless power receiving unit further comprises a switch that turns on or off a path between the charger and one of the wireless power receivers connected to one of the power receiving members included in the first side cover, to correspond to an open or shut state of the first side cover and the second side cover.

2. The cover member of claim 1, wherein the wireless power receiving unit is included in one of the first side cover and the second side cover.

3. The cover member of claim 1, wherein each of the wireless power receivers is included in a corresponding cover among the first side cover and the second side cover.

4. A cover member of claim 1, wherein the switch is turned on when the first side cover and the second side cover are open and is turned off when the first side cover and the second side cover are shut.

5. The cover member of claim 1, wherein the second side cover is installed in the electronic device as a back side cover of the electronic device.

6. A cover member of an electronic device, the cover member comprising:
   a first side cover and a second side cover hingedly connected that include a power receiving member configured to wirelessly receive power, respectively; and
   a wireless power receiving unit that receives power through at least one of the power receiving members and generates power for charging,
   wherein the wireless power receiving unit comprises wireless power receivers that are respectively connected with the power receiving members, receive power through correspondingly connected power receiving members, and generate the power for charging,
   wherein the wireless power receivers are connected with a charger that charges a battery, and
   wherein the wireless power receiving unit further comprises:
      a first switch configured to turn on or off a path between the charger and one of the wireless power recivers connected with one of the power receiving members included in the first side cover;
      a second switch configured to turn on or off a path between the charger and another of the wireless power receivers connected to another of the power receiving members included in the second side cover; and
      a controller configured to control turning on or off of the first switch and the second switch to correspond to an open or shut state of the first side cover and the second side cover and an overturn state of the electronic device.

7. The cover member of claim 6, wherein the controller is further configured to perform:
   turning on both the first switch and the second switch when the first side cover and the second side cover are open;
   turning the first switch on and turning the second switch off when the first side cover and the second side cover are shut and the electronic device is upside down; and
   turning the first switch off and turning the second switch on when the first side cover and the second side cover are shut and the electronic device is not overturned.

8. An electronic device comprising:
   a charger configured to charge a battery through power for charging generated by at least one of wireless power receivers, the wireless power receivers respectively receiving power through power receiving members respectively included in a first side cover and a second cover hingedly connected, and generating the power for charging;
   a cover sensor configured to sense an open and shut state of the first side cover and the second side cover; and
   a switch configured to turn on or off a path between the charger and one of the wireless power receivers connected with one of the power receiving members included in the first side cover, to correspond to the open or shut state of the first side cover and the second side cover,
   wherein, when the first side cover and the second side cover are shut, the first side cover covers a front side surface of the electronic device and the second side cover covers a back side surface of the electronic device.

9. The electronic device of claim 8, wherein the switch is turned on when the first side cover and the second side cover are open and is turned off when the first side cover and the second side cover are shut.

10. An electronic device comprising:
    a charger configured to charge a battery through power for charging generated by at least one of wireless power receivers, the wireless power receivers respectively receiving power through power receiving members respectively included in a first side cover and a second cover hingedly connected, and generating the power for charging;
    a first switch configured to turn on or off a path between the charger and one of the wireless power receivers connected with one of the power receiving members included in the first side cover;

a second switch configured to turn on or off a path between the charger and another of the wireless power receivers connected with another of the power receiving member included in the second side cover;

a cover sensor configured to sense an open and shut state of the first side cover and the second side cover;

a pose sensor configured to sense whether the electronic device is upside down; and a controller configured to control turning on or off of the first switch and the second switch to correspond to the open or shut state of the first side cover and the second side cover and an overturn state of the electronic device.

11. The electronic device of claim 10, wherein the controller is configured to perform:

turning on both the first switch and the second switch when the first side cover and the second side cover are open;

turning the first switch on and turning the second switch off when the first side cover and the second side cover are shut and the electronic device is upside down; and turning the first switch off and turning the second switch on when the first side cover and the second side cover are shut and the electronic device is not overturned.

12. A wireless charging method of an electronic device, the wireless charging method comprising:

generating power for charging from power wirelessly received through at least one of power receiving members respectively included in hingedly connected a first side cover and a second side cover; and charging a battery with the power for charging, wherein, when the first side cover and the second side cover are shut, the first side cover covers a front side surface of the electronic device and the second side cover covers a back side surface of the electronic device, and wherein the generating of the power for charging further comprises:

sensing an open or shut state of the first side cover and the second side cover;

generating the power for charging from power wirelessly received through the one of the power receiving members included in the first side cover and the other of the power receiving members included in the second side cover when the first side cover and the second side cover are open; and generating the power for charging from power wirelessly received through a power receiving member included in the second side cover when the first side cover and the second side cover are shut.

13. A wireless charging method of an electronic device, the wireless charging method comprising:

generating power for charging from power wirelessly received through at least one of power receiving members respectively included in hingedly connected a first side cover and a second side cover; and charging a battery with the power for charging, wherein the generating of the power for charging further comprises:

sensing an open or shut state of the first side cover and the second side cover;

sensing whether the electronic device is upside down; and generating power for charging using at least one power receiving member corresponding to the open or shut state of the first side cover and the second side cover and an overturn state of the electronic device from among the power receiving members.

14. The wireless charging method of claim 13, wherein the generating of the power for charging using the at least one power receiving member further comprises:

generating the power for charging using all of the power receiving members when the first side cover and the second side cover are open;

generating power for charging using one of the power receiving members included in the first side cover when the first side cover and the second side cover are shut and the electronic device is upside down; and generating power for charging using another of the power receiving members included in the second side cover when the first side cover and the second side cover are shut and the electronic device is not overturned.

* * * * *